US011007568B2

(12) United States Patent
Liang et al.

(10) Patent No.: US 11,007,568 B2
(45) Date of Patent: May 18, 2021

(54) DROPLET GENERATING METHOD FOR METAL THREE-DIMENSIONAL PRINTING

(71) Applicant: NANJING TAITAO INTELLIGENT SYSTEM CO., LTD., Jiangsu (CN)

(72) Inventors: Fupeng Liang, Jiangsu (CN); Chaobao Luo, Guangxi (CN)

(73) Assignee: NANJING TAITAO INTELLIGENT SYSTEM CO., LTD., Jiangsu (CN)

( * ) Notice: Subject to any disclaimer, the term of this patent is extended or adjusted under 35 U.S.C. 154(b) by 126 days.

(21) Appl. No.: 16/330,571

(22) PCT Filed: Sep. 4, 2017

(86) PCT No.: PCT/CN2017/100323
§ 371 (c)(1),
(2) Date: Mar. 5, 2019

(87) PCT Pub. No.: WO2018/041259
PCT Pub. Date: Mar. 8, 2018

(65) Prior Publication Data
US 2020/0238372 A1 Jul. 30, 2020

(30) Foreign Application Priority Data
Sep. 5, 2016 (CN) .......................... 201610801568.2

(51) Int. Cl.
*B22D 23/00* (2006.01)
*B33Y 10/00* (2015.01)

(52) U.S. Cl.
CPC ............ *B22D 23/003* (2013.01); *B33Y 10/00* (2014.12)

(58) Field of Classification Search
CPC ........ B22D 23/003; B33Y 10/00; B33Y 30/00
See application file for complete search history.

(56) References Cited

U.S. PATENT DOCUMENTS 5,261,611 A * 11/1993 Huxford .................. B05B 5/00
222/594
2013/0306198 A1* 11/2013 Prest ....................... C22C 45/00
148/403
(Continued)

FOREIGN PATENT DOCUMENTS

CN 104001918 A 8/2014
CN 105880598 A 8/2016
(Continued)

OTHER PUBLICATIONS

English Language translation of CN 105880598 A (Year: 2016).*
(Continued)

*Primary Examiner* — Scott R Kastler
(74) *Attorney, Agent, or Firm* — Schwegman Lundberg & Woessner, P.A.

(57) ABSTRACT

The present invention discloses a droplet generating method for metal three-dimensional printing, and in a process of accumulating a liquid metal or softened flowable metal in a building process through metal three-dimensional printing, a metal flow is fragmentized to form metal droplets; wherein in the process of accumulating the liquid metal or softened flowable metal, a current is applied between the metal flow and a printed metal (7), through a manner of resistance heating, part of the metal flow is heated and gasified to fuse the metal flow, and the metal droplets are formed on the printed metal (7). In the present invention, in a building process through metal three-dimensional printing, metal droplets of a tiny volume can be generated rapidly, the control method is simple and the response speed is high; the common "dragging" problem of a molten raw material in an FDM three-dimensional printing technology is solved; a "metallurgical fusion" is realized between the generated metal droplets and the printed metal (7), and the connection strength is extremely high; and "metallurgical electrical
(Continued)

field-based regulation" can be integrated into a building process through metal three-dimensional printing.

7 Claims, 3 Drawing Sheets

(56) References Cited

U.S. PATENT DOCUMENTS

2019/0314891 A1* 10/2019 Liang .................... B22D 23/003
2020/0238372 A1* 7/2020 Liang ..................... B33Y 10/00

FOREIGN PATENT DOCUMENTS

| CN | 106270518 A | 1/2017 |
|---|---|---|
| CN | 106270518 B | 3/2019 |
| EP | 0822020 A1 | 2/1998 |

OTHER PUBLICATIONS

"International Application Serial No. PCT/CN2017/100323, International Search Report dated Oct. 30, 2017", (Oct. 30, 2017), 2 pgs.
"International Application Serial No. PCT/CN2017/100323, Written Opinion dated Oct. 30, 2017", (Oct. 30, 2017), 4 pgs.
Fang, Ming, et al., "Experiments on remelting and solidification of molten metal droplets deposited in vertical columns", Journal of Manufacturing Science and Engineering 129.2, (2007), 311-318.
He, Li-Jia, "Effect and Recent Advances in Electric Pulse Field on Metallic Structure", Journal of Liaoning institute of Technology vol. 23 No. 5, (2003), 4 pgs.
Liu, Jin, et al., "Effect of External Electric Field on Solidification Structure of Alloy", Foundry vol. 61, No, 8, (Aug. 2012), 877-881.
"Chinese Application Serial No. 201610801568.2, Office Action dated Sep. 4, 2018", w/English Translation, (Sep. 4, 2018), 17 pgs.
Sun, Yue-Hua, et al., "Direct ink writing: A novel avenue for engineering micro-/nanoscale 3D structures", The Chinese Journal of Nonferrous Metals vol. 25.6, (Jun. 2015), 14 pgs.

* cited by examiner

DROPLET GENERATING METHOD FOR METAL THREE-DIMENSIONAL PRINTING

PRIORITY APPLICATIONS

This application is a U.S. National Stage Filing under 35 U.S.C. 371 from International Application No. PCT/CN2017/100323, filed on Sep. 4, 2017, and published as WO2018/041259 on Mar. 8, 2018, which claims the benefit of priority to Chinese Application No. 201610801568.2, filed on Sep. 5, 2016; the benefit of priority of each of which is hereby claimed herein, and which applications and publication are hereby incorporated herein by reference in their entirety.

FIELD OF THE INVENTION

The present invention relates to the technology of three-dimensional printing, in particular to a droplet generating method for metal three-dimensional printing, belonging to the technical field of additive manufacturing.

BACKGROUND OF THE INVENTION

Three-dimensional printing technology originated in the U.S. at the end of the 19$^{th}$ century, and was perfected and commercialized in Japan and the U.S. in the 1970s and 1980s. The mainstream three-dimensional printing technologies commonly seen now, such as Stereo Lithography Apparatus (SLA), Fused Deposition Modeling (FDM), Selecting Laser Sintering (SLS) and Three Dimensional Printing and Gluing (3DP), were commercialized in the U.S. in the 1980s and the 1990s. In the technology in which three-dimensional printing is realized through melting raw materials in a stacking manner, such as the commonly seen FDM plastic printing and other metal printing with similar principles, one of the important core components is a furnace/extrusion head/generation apparatus which generates molten raw materials. At present, many patent applications on a generation apparatus for generating molten metal raw materials are available, such as a Chinese patent application with an application number of 201410513433.7 and entitled "3D Printing Head for Metal Melt Extrusion Building", and a Chinese patent application with an application number of 201520533246.5 and entitled "Apparatus for Semi-solid Metal Extrusion Deposition Building". In these patent applications, droplets cannot be generated, and continuous metal flows are generated. Some publically known techniques through which metal droplets can be generated are also applied to the building process through metal three-dimensional printing, such as an apparatus and a method recorded in the literature entitled "Experiments on remelting and solidification of molten metal droplets deposited in vertical columns" (source: title of the journal: *Journal of Manufacturing Science and Engineering-Transactions of the Asme*, Pages 311-318, No. 2, Vol. 129, 2007). The major principle is as follows: a gas is adopted to push a liquid metal in a miniature furnace/crucible to be ejected out of a nozzle to form a metal flow. If a pulse air flow is used to generate a pulsed pressure vibration inside the miniature furnace/crucible, then metal droplets can be formed at an outlet of a nozzle, however, since the gas is in a compressible physical form, pressure conduction is delayed, and the generation speed of metal droplets is low. A Chinese patent application with an application number of 201520561484.7 and entitled "Liquid Metal Printing Cartridge" just used the technique recorded in the above literature. However, a structure proposed in the patent application is not applicable to high melting point materials (such as ceramics, titanium alloys, etc.), and solid raw materials cannot be added continuously in an operating process. For another example, in a Chinese patent application with an application number of 201310721955.1 and entitled "Method for Improving Density of Components Built through On-demand Printing Deposition of Metal Droplets", the liquid metal is also ejected out of a furnace/crucible to form metal droplets. In these methods for generating metal droplets, metal droplets are all generated through applying a pressure and utilizing properties of a fluid. Since surface tension and viscous force of the liquid metal are relatively high, metal droplets with a tiny volume are not easily generated, and the generation speed of metal droplets is low.

SUMMARY OF THE INVENTION

An objective of the present invention is to provide a simple generation method of metal droplets which is integrated into a building process through metal three-dimensional printing, a metallurgical fusion can be realized between the generated metal droplets and a printed metal (metal which has been built by printing), and the internal structures of the metal droplets after the metal droplets are cooled can be regulated through an electric field.

To achieve the above objective of the present invention, the present invention adopts the following technical solution: a droplet generating method for metal three-dimensional printing is provided, wherein a heating device is adopted to heat and melt a solid metal raw material to obtain a liquid metal or softened flowable metal, and the liquid metal or softened flowable metal forms a metal flow under the effect of an external force; and the three-dimensional printing is realized through accumulating the liquid metal or softened flowable metal, and in the process of accumulating the liquid metal or softened flowable metal, the metal flow is fragmentized to form metal droplets;

characterized in that:

in the process of accumulating the liquid metal, a current (or an electric current) is applied between the liquid metal and a printed metal, through a manner of resistance heating, part of a liquid metal flow is heated and gasified to cut off (also belonging to fusing) a liquid metal flow, and the metal droplets are formed on the printed metal;

or, in the process of accumulating the softened flowable metal, a current is applied between the softened flowable metal and a printed metal, through a manner of resistance heating, part of the softened flowable metal is heated and liquefied to form a liquid metal, part of the formed liquid metal is further heated and gasified by the current to cut off (also belonging to fusing) the liquid metal, and the metal droplets are formed on the printed metal;

the printed metal is formed after the previous liquid metal has no fluidity (possesses no flowability). Previously accumulated heat of the liquid metal is guided away by an object in contact with the liquid metal and by the environment, and after the temperature is lowered to a certain threshold, fluidity or flowability (including creep deformation) is lost.

Since for each of most metals, there is a greater difference between the melting point and the boiling point thereof, for example, the melting point of pure titanium under a standard atmospheric pressure is 1660° C., and the boiling point thereof is 3287° C. (data source: Encyclopedia), if "linear" liquid titanium metal is heated with an energy at a high strength and a high density within an extremely short time, a region, far away from "a low-temperature body" (for example, a printed metal), of the "linear" liquid titanium metal is heated to a boiling point, while a region, close to "a low-temperature body" (for example, a printed metal), of the "linear" liquid titanium metal cannot reach a boiling point since part of its heat is guided away by the "low-temperature body", for example, if a current of 200 A is applied to a liquid titanium metal wire having a length of 100 µm and a diameter of 60 µm within one hundred thousandth of a second, the region where the temperature reaches a boiling point is rapidly gasified, then the liquid titanium metal wire is fractured (fused), while a region which is close to and in contact with the "low-temperature body" is not gasified, is kept to be connected with the "low-temperature body", and is adhered onto the "low-temperature body" (for example a printed metal). The liquid metal which is retained on the "low-temperature body" (for example a printed metal) still keeps its liquid state to form metal droplets. In the process of generating metal droplets, "resistance heating" will also occur at the position in which the "low-temperature body" (for example, a printed metal) is in contact with liquid metal and which is located at the side of the "low-temperature body". When the heating power and energy density exceed a certain threshold, the effect of "resistance heating" melts the part of the "low-temperature body", the heat conduction speed of metal is not sufficient to offset partial fusion caused by "resistance heating", and then a miniature melting pool which is close to an interface is formed at the side of the "low-temperature body" at an interface in which the "low-temperature body" (for example, a printed metal) is in contact with liquid metal. A miniature melting pool is formed on the surface of a solid metal under a normal temperature, and this is commonly seen in industrial engineering, for example, part of a surface of a metal workpiece is instantly melted and even gasified through such heating manners as laser, electric arc and plasma, that is, a high-density energy at a certain power is utilized to heat part of a metal to a temperature above the melting point within an extremely short time (the temperature rise speed of part of a metal far exceeds the heat dissipation speed of the metal).

Optionally, a current is applied between the liquid metal and the printed metal means that a current is applied after the liquid metal is in contact with the printed metal; and a current is applied between the softened flowable metal and the printed metal means that a current is applied after the softened flowable metal is in contact with the printed metal.

Optionally, in a process of printing the first layer of a metal component through a three-dimensional printing system:

in the process of accumulating the liquid metal, a current is applied between the liquid metal and a three-dimensional printing support platform or support layer, through a manner of resistance heating, part of a liquid metal flow is heated and gasified to cut off (also belonging to fusing) a liquid metal flow, and the metal droplets are formed on the three-dimensional printing support platform or support layer;

or, in the process of accumulating the softened flowable metal, a current is applied between the softened flowable metal and a three-dimensional printing support platform or support layer, through a manner of resistance heating, part of the softened flowable metal is heated and liquefied to form a liquid metal, part of the formed liquid metal is further heated and gasified by the current to cut off (also belonging to fusing) the liquid metal, and the metal droplets are formed on the three-dimensional printing support platform or support layer;

when the metal component is printed through the three-dimensional printing system, the metal component is constructed by layers, that is, the metal component to be printed is generated in a manner of superposition layer by layer;

the three-dimensional printing support platform is a platform to support the metal component to be printed;

the support layer is a supportive conductive material layer which is in contact with the metal component to be printed.

Optionally, a current is applied between the liquid metal and the three-dimensional printing support platform or support layer means that a current is applied after the liquid metal is in contact with the three-dimensional printing support platform or support layer; and a current is applied between the softened flowable metal and the three-dimensional printing support platform or support layer means that a current is applied after the softened flowable metal is in contact with the three-dimensional printing support platform or support layer.

Optionally, the heating device heats and melts the solid metal raw material to obtain the liquid metal, or heats the solid metal raw material to form the softened flowable metal, and the liquid metal or softened flowable metal is pushed out of the heating device under a pressure to form the metal flow.

Optionally, the heating device adopts such heating manners as electromagnetic induction heating, or electric arc heating, or plasma heating, or resistance heating.

Optionally, the softened flowable metal means that the metal is heated and melted but does not reach a degree of liquidation, and the metal is deformable (including creep deformation), movable or flowable under an external force.

Optionally, in addition to a pure metal, a raw material used in the three-dimensional printing can be other conductive materials (not a pure metal), with the three-dimensional printing method being the same as the metal three-dimensional printing method (that is, realizing three-dimensional printing through accumulating a liquid conductive material or softened flowable conductive material). When other conductive materials (not a pure metal) are adopted as a raw material of the three-dimensional printing, the generated droplets are droplets of the raw material used, and the method for generating droplets is the same as the above method for generating metal droplets (that is, in a process of accumulating a liquid conductive material or softened flowable conductive material, a conductive material flow is fragmentized to form droplets of the conductive material, and through a manner of resistance heating, part of the conductive material flow is gasified to realize fragmentation). For example, a mixture of metal and ceramics (for example, Ti(C, N)-based metal ceramics, belonging to an alloy) and conductive compounds (for example, titanium carbide, TiC) are all conductive materials, but they are not pure metal materials.

The present invention has the following beneficial effects:

(1) In the present invention, through applying a heavy current between the liquid metal and the printed metal, "resistance heating" is generated on the liquid metal and at the position in which the printed metal is in contact with the liquid metal, such that the temperature of the liquid metal is further raised. The temperature at the part, far away from the printed metal, of the liquid metal reaches a boiling point. As to the liquid metal which is close to the printed metal, since part of its heat has been guided away by the printed metal, the temperature at this part cannot reach a boiling point, then the liquid metal flow is cut off (fused) at a high temperature, thereby forming metal droplets on the printed metal. Since the fusing of the liquid metal flow depends on a current, rather than a mechanical power, this manner reduces complexity of the metal three-dimensional printing system, then the controllability is higher; and through the method, metal droplets with a tiny volume can be generated, therefore, the generation speed of droplets is fast, and the control method is simple.

(2) In the present invention, through applying a heavy current between the liquid metal and the printed metal, "resistance heating" is generated on the liquid metal and at the position in which the printed metal is in contact with the liquid metal, then the position at which the printed metal is in contact with the liquid metal is fused, and further the liquid metal is connected with the printed metal in a "fusing" manner (namely, metallurgical fusing), therefore, a metal component generated through three-dimensional printing acquires an extremely high structural strength.

(3) In the present invention, metal droplets are generated simultaneously in a building process through three-dimensional printing, thereby the "dragging" problem resulted in an accumulating process of a metal flow ejected out or sprayed out by a heating device can be solved. Surface tension and viscous force of the liquid metal are relatively large, and the viscous force of softened flowable metal is even greater than that of the liquid metal. In a process of accumulating the liquid metal or softened flowable metal, "dragging" will occur. In a printed pixel queue, a wirelike metal "bridge" which connects two pixel points is generated between two pixel points which are not adjacent to each other and which have a sequential relationship, or a metal wire which is connected with some pixel points is generated, which may have an adverse effect on metal three-dimensional printing. In the present invention, through a manner of "fusion", the generation of "dragging" is avoided while droplets are generated.

(4) In the present invention, metal droplets are formed through "resistance heating" generated by applying a current, a metal which is softened but not completely liquefied can be adopted as a raw material, part of the softened flowable metal is heated and liquefied through a manner of "resistance heating", and part of the softened flowable metal is further heated, such that part of the obtained liquid metal is gasified to generate metal droplets, thereby the working temperature of a heating device can be lowered, and further a higher feasibility can be obtained and the energy consumption can be reduced.

(5) In the present invention, "resistance heating" generated from an applied current is adopted to regulate a molten state of a metal at a building position in a building process through metal three-dimensional printing. An electric field can influence a crystal nucleus growth process of an alloy under a liquefied state, and proper electric field parameters (for example, oscillation frequency, current intensity, etc.) can improve mechanical properties of an alloy. Many researches about the influence of an electric field on metal structures are available, for example, a literature entitled *Research Development of Metal Structures under an Effect of a Pulsed Electric Field* (Summary) written by He Lijia and published on the Journal of Liaoning Institute of Technology, No. 5, Vol. 23, 2003; for another example, a literature entitled *Influence of an External Electric Field on Alloy Solidification Structures* (Summary) written by Liu Jin et. al. and published on the journal named China Foundry, No. 8, Vol. 61, 2012. In the present invention, "metallurgical electrical field-based regulation" can be integrated into a building process through metal three-dimensional printing.

In summary, some beneficial effects of the present invention are listed as follows: in a building process through metal three-dimensional printing, metal droplets of a tiny volume can be generated rapidly, the control method is simple and the response speed is high; the common "dragging" problem of a molten raw material in an FDM three-dimensional printing technology is solved; a "metallurgical fusion" is realized between the generated metal droplets and the printed metal, and the connection strength is extremely high; and "metallurgical electrical field-based regulation" can be integrated into a building process through metal three-dimensional printing, and the feasibility is high. The present invention possesses a substantial progress.

Figure 1:
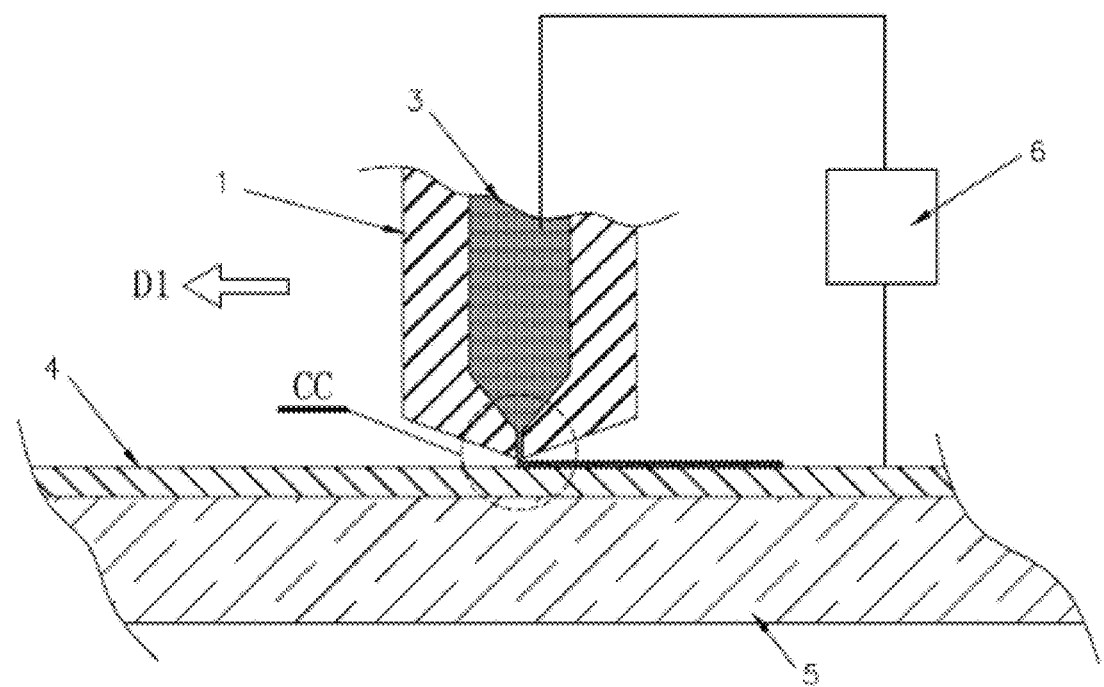
FIG. 1 is a schematic diagram illustrating a preferred specific embodiment of the present invention, wherein a metal three-dimensional printing system prints the first layer of metal, and an arrow D1 in the figure represents a movement direction.

Reference numerals in the figures: 1—miniature furnace, 2—nozzle, 3—molten metal raw material, 4—support layer, 5—support platform, 6—heating current generation circuit, 7—printed metal (metal which has been built by printing).

DETAILED DESCRIPTION OF THE EMBODIMENTS

The present invention will be described in detail below with a preferred specific embodiment of the present invention as an example and in combination with accompanying drawings.

A specific embodiment of the present invention as shown in FIG. 1 to FIG. 5: a droplet generating method for metal three-dimensional printing is provided, wherein a heating device is adopted to heat and melt a solid metal raw material to obtain a liquid metal or softened flowable metal, and the liquid metal or softened flowable metal forms a metal flow under the effect of an external force; and the metal three-dimensional printing is realized through accumulating the liquid metal or softened flowable metal, and in a process of accumulating the liquid metal or softened flowable metal, the metal flow is fragmentized to form metal droplets; the liquid metal forms a printed metal after it has no fluidity; and the softened flowable metal means that the metal is heated and melted but does not reach a degree of liquefaction, and the metal is deformable (including creep deformation), movable or flowable under an external force;

characterized in that:

in the process of accumulating the liquid metal, a current is applied between the liquid metal and the printed metal, through a manner of resistance heating, part of a liquid metal flow is heated and gasified to cut off/fuse a liquid metal flow, and the metal droplets are formed on the printed metal;

or, in the process of accumulating the softened flowable metal, a current is applied between the softened flowable metal and the printed metal, through a manner of resistance heating, part of the softened flowable metal is heated and liquefied to form a liquid metal, part of the formed liquid metal is further heated and gasified by the current to cut off/fuse the liquid metal, and the metal droplets are formed on the printed metal.

In the present specific embodiment, in a process of printing the first layer of a metal component through a metal three-dimensional printing system:

in the process of accumulating the liquid metal, a current is applied between the liquid metal and a three-dimensional printing support platform or support layer, through a manner of resistance heating, part of a liquid metal flow is heated and gasified to cut off/fuse a liquid metal flow, and the metal droplets are formed on the three-dimensional printing support platform or support layer;

or, in the process of accumulating the softened flowable metal, a current is applied between the softened flowable metal and a three-dimensional printing support platform or support layer, through a manner of resistance heating, part of the softened flowable metal is heated and liquefied to form a liquid metal, part of the formed liquid metal is further heated and gasified by the current to cut off/fuse the liquid metal, and the metal droplets are formed on the three-dimensional printing support platform or support layer.

In the present specific embodiment, when the metal component is printed through the metal three-dimensional printing system, the metal component is constructed by layers, that is, the metal component to be printed is generated in a manner of superposition layer by layer; the three-dimensional printing support platform is a platform to support the metal component to be printed; and the support layer is a supportive conductive material layer which is in contact with the metal component to be printed.

In the present specific embodiment, the heating device is composed of a miniature furnace 1 and an electromagnetic induction coil (not shown in the figure), wherein a nozzle 2 is arranged at a lower end of the miniature furnace 1; a shell of the miniature furnace 1 is manufactured from a special tungsten alloy; the electromagnetic induction coil surrounds the periphery of a lower segment of the miniature furnace 1; an intermediate frequency alternating magnetic field generated by an electromagnetic induction coil is coupled in the shell of the miniature furnace 1 and metal raw materials within the miniature furnace 1 to induce an eddy current, and then leads to heating to heat and melt solid metal raw materials, and melting states (including a liquefied state and a softened state) of solid metal raw materials are determined by heating power and heating time; and a high pressure generated through extrusion pushes the liquid metal or softened flowable metal out of a heating device to form a metal flow. Molten metal raw materials 3 are pushed through a screw or a piston which is arranged inside a miniature furnace 1, or a common extrusion manner in an FDM three-dimensional printing technology is adopted to generate an extrusion effect on the molten metal raw materials 3.

In the present specific embodiment, a support layer 4 is arranged between a support platform 5 of a metal three-dimensional printing system and a metal component to be printed. The support layer 4 is a piece of flat metal plate of the same material as the metal component to be printed, and as a consumable item, the support layer 4 prevents the support platform 5 from being damaged by miniature fusion caused by "resistance heating". The support platform 5 can be moved upward and downward, and a heating device can perform a two-dimensional movement based on a horizontal plane (the normal of the horizontal plane is coincided with or in parallel with the vertical direction). The miniature furnace 1 and the support layer 4 are both connected to a heating current generation circuit 6, and a current generated by the heating current generation circuit 6 passes by the miniature furnace 1 and the support layer 4 and is conducted to the liquid metal or softened metal which is ejected from the nozzle 2 and which is in contact with the support layer 4 or the printed metal 7. The inner diameter of the nozzle 2 is 60 μm; when the first layer of a metal component is printed, the distance between a lower end face of the nozzle 2 and an upper surface of the support layer 4 is 100 μm; and when the second layer of a metal component is printed, the distance between a lower end face of the nozzle 2 and an upper plane of the printed metal 7 is 100 μm.

In the present specific embodiment, the raw material used in the three-dimensional printing is a pure metal (only containing a metal and containing no other compounds), and the generated droplets are pure metal droplets.

Specific application solutions:

A heating device heats and melts solid metal raw materials, molten metal raw materials 3 are obtained in a miniature furnace 1, and molten metal raw materials 3 are extruded to be ejected out of a nozzle 2. The heating device moves towards a direction indicated by an arrow D1 as shown in FIG. 1.

A miniature furnace 1 ejects liquid metals in two modes: the first one is a discontinuous type/a pulsed type, wherein a pulsed pressure vibration is generated inside the miniature furnace 1, such that the miniature furnace 1 ejects a metal liquid of a certain volume at the position corresponding to each pixel point; the second one is a continuous type, wherein within a set time duration, an extrusion pressure inside the miniature furnace 1 maintains stable, and in a moving process of the miniature furnace 1, a metal liquid is ejected out while the miniature furnace moves. In the present specific embodiment, the second mode (continuous type) is adopted.

The process for generating metal droplets is as shown in FIG. 2 to FIG. 5.

Figure 3:
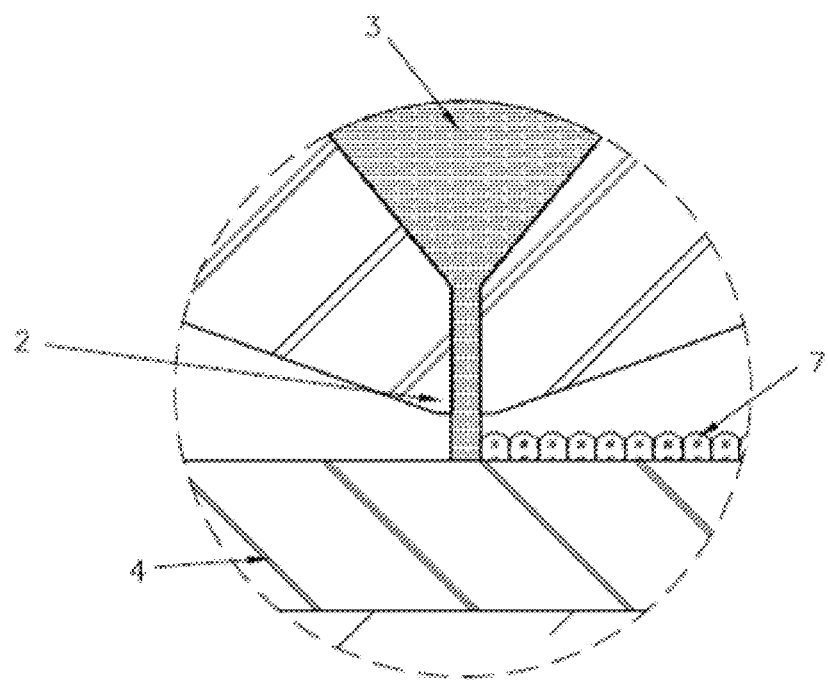
FIG. 3 is a schematic diagram illustrating a state of a generating process of metal droplets before a current is applied as shown in FIG. 2.

As shown in FIG. 3, when the first layer of a metal component is printed by a metal three-dimensional printing system, after the liquid metal is ejected out of a nozzle 2, at the instant when the liquid metal is in contact with a support layer 4, a control system of a metal three-dimensional printing system monitors that the liquid metal is in contact with the support layer 4, that is, the control system monitors that an electrical connection is established between the miniature furnace 1 and the support layer 4; afterwards, the control system starts a heating current generation circuit 6. In the present specific embodiment, the control system monitors the "event" and starts the heating current generation circuit 6 within ten millionths of a second after the liquid metal is in contact with the support layer 4.

Figure 2:
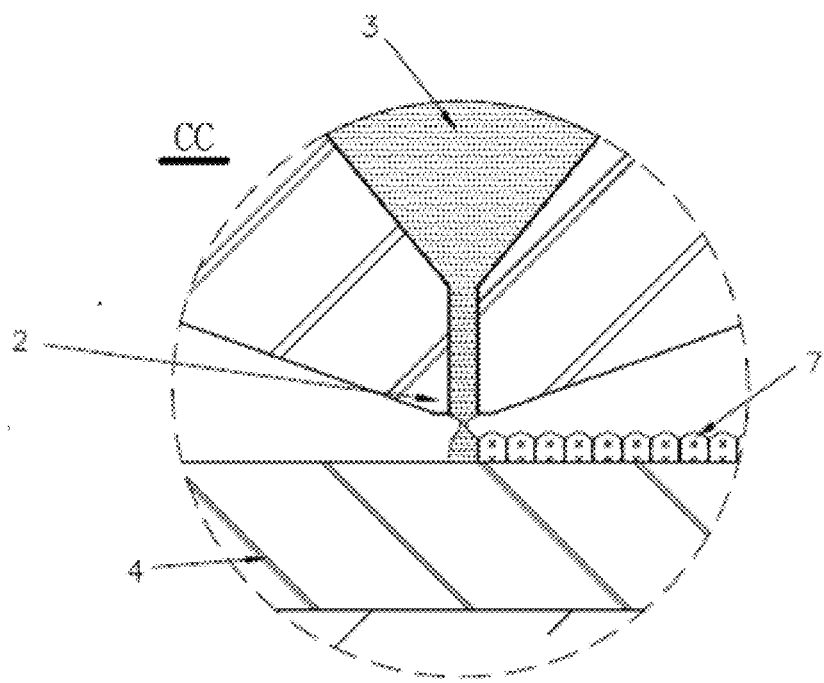
FIG. 2 is a schematic diagram which shows an enlarged view of the part indicated by a dotted line CC in FIG. 1 and which illustrates a process of generating metal droplets when a metal three-dimensional printing system prints the first layer of metal.

As shown in FIG. 2, a heavy current (for example, 200 A) is applied to the liquid metal between a nozzle 2 and a support layer 4. One side, deviating towards the nozzle 2, of a middle segment of the liquid metal is gasified and the diameter is gradually reduced (the lasting time of the process is extremely short), meanwhile, since the temperature of the part is higher than that of other parts, and since the surface tension is low, the metal liquid in this part is dragged by other parts with a higher surface tension, thereby exacerbating diameter reduction of this part. One side, deviating towards the nozzle 2, of a middle segment of liquid metal is completely gasified within a time shorter than one hundred thousandth of a second (for example, one five hundred thousandth of a second), then the liquid metal is fused (cut off by a current); one end, in contact with the support layer 4, of the liquid metal is not evaporated and is adhered onto the support layer 4, and the liquid metal still keeps a liquid state within an extremely short time, that is, a metal droplet is formed on the support layer 4. As to an end, in contact with the nozzle 2, of the liquid metal, since the temperature of the nozzle 2 is lower than gasification temperature of metal raw materials, the nozzle 2 guides away part of heat, then the liquid metal which is close to the nozzle 2 cannot be gasified. As to the liquid metal inside the nozzle 2, since the nozzle 2 is also conductive, a current component obtained by the liquid metal inside the nozzle 2 is far less than the liquid metal between the nozzle 2 and the support layer 4, so the liquid metal inside the nozzle 2 is still in a liquid state.

After the liquid metal is cut off/fused, the control system monitors the "event", and immediately turns off the heating current generation circuit 6.

A generation process of metal droplets shown in FIG. 2 and FIG. 3 exists in the moving process of the miniature furnace 1. A movement speed of the miniature furnace 1 and a ejecting speed of the liquid metal should be coordinated mutually, and the two parameters are adjusted to produce a distance between metal droplets and the formed droplet-shaped, printed metal thereby. An ejecting speed of the liquid metal further depends on pressure intensity and temperature inside the miniature furnace 1 and the type of metal raw materials.

Figure 4:
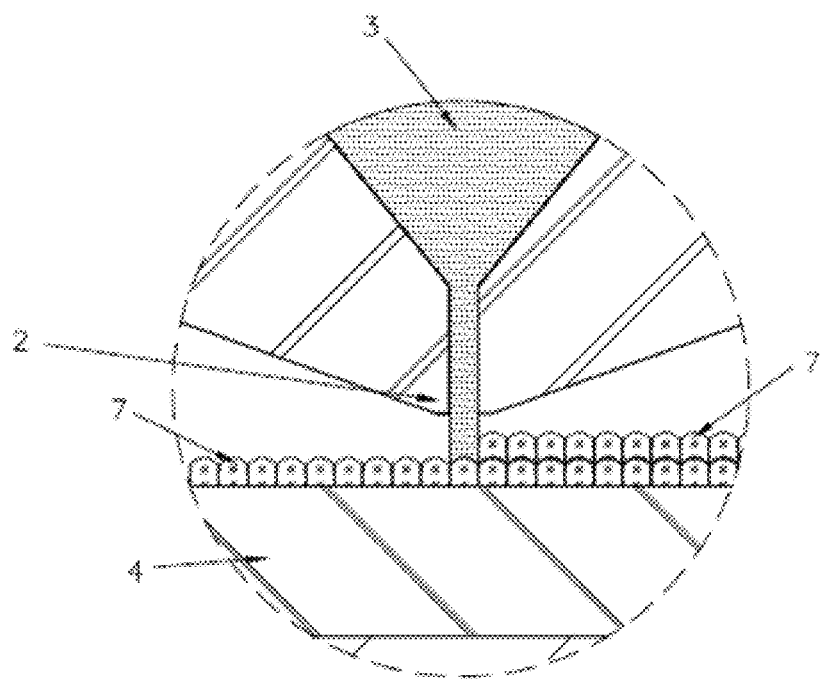
FIG. 4 and FIG. 5 are schematic diagrams illustrating a process of generating metal droplets when a metal three-dimensional printing system prints the second layer of metal in a preferred specific embodiment of the present invention as shown in FIG. 1.
Figure 5:
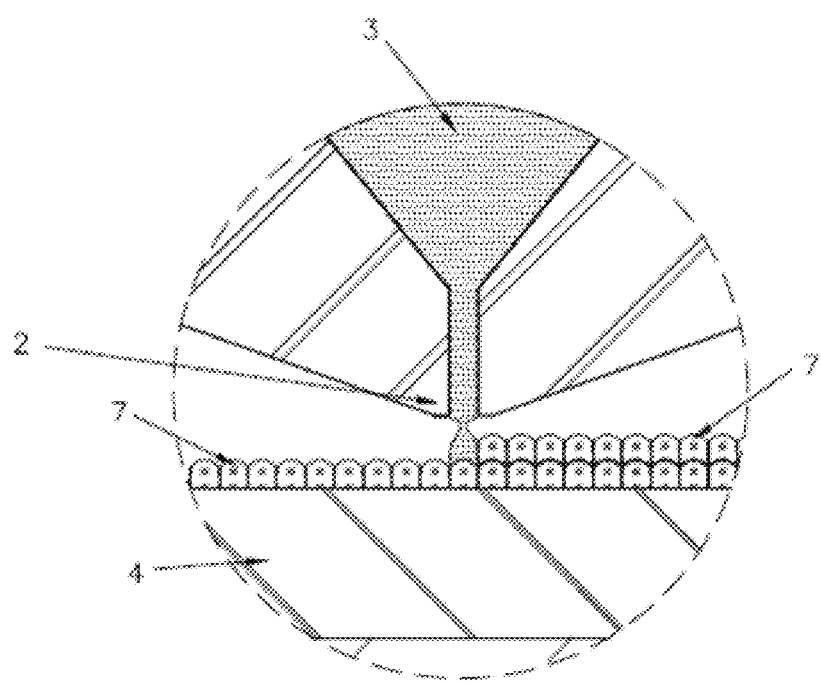

Similarly, as shown in FIG. 4 and FIG. 5, when the second layer and the above layers of a metal component are printed by a metal three-dimensional printing system, the liquid metal located between the nozzle 2 and the printed metal 7 is fused in the same way and forms metal droplets on the printed metal 7.

Since for each of most metals, there is a greater difference between the melting point and the boiling point thereof, for example, the melting point of pure titanium under a standard atmospheric pressure is 1660° C., and the boiling point thereof is 3287° C. (data source: Encyclopedia), if "linear" liquid titanium metal is heated with an energy at a high strength and a high density within an extremely short time, the region, far away from "a low-temperature body" (for example, a printed metal), of the "linear" liquid titanium metal is heated to a boiling point or even higher, while the region, close to "a low-temperature body" (for example, a printed metal), of the "linear" liquid titanium metal cannot reach a boiling point since part of its heat is guided away by the "low-temperature body", for example, if a current of 200 A is applied to a liquid titanium metal wire which has a length of 100 μm and a diameter of 60 μm within one hundred thousandth of a second, the region where the temperature reaches a boiling point is rapidly gasified, then the liquid titanium metal wire is fractured (fused), while the region which is close to and in contact with the "low-temperature body" is not gasified, is kept to be connected with the "low-temperature body", and is adhered onto the "low-temperature body" (for example a printed metal). A liquid metal which is retained on the "low-temperature body" (for example a printed metal) still keeps its liquid state to form metal droplets.

In the above process of generating metal droplets, "resistance heating" will also occur at the position in which the "low-temperature body" (for example, a printed metal) is in contact with the liquid metal and which is located at the side of the "low-temperature body". When the heating power and energy density exceed a certain threshold, the effect of "resistance heating" melts the part of the "low-temperature body", the heat conduction speed of metal is not sufficient to offset partial fusion caused by "resistance heating", and then a miniature melting pool which is close to an interface is formed at the side of the "low-temperature body" of an interface in which the "low-temperature body" (for example, melt built through printing) is in contact with the liquid metal. A miniature melting pool is formed on the surface of a solid metal under a normal temperature, and this is commonly seen in industrial engineering, for example, part of a surface of a metal workpiece is instantly melted and even gasified through such heating manners as laser, electric arc and plasma, that is, a high-density energy at a certain power is utilized to heat part of a metal to a temperature above the melting point within an extremely short time (the temperature rise speed of part of a metal far exceeds the heat dissipation speed of the metal).

A compressed inert gas can also be adopted by the miniature furnace 1 to push molten metal raw materials to flow. A metal flow can also be generated by the following manner: a metal wire is used to penetrate through a high temperature resistant casing, an electromagnetic induction coil is set on the periphery of a lower end of the casing, a wire feeding roller is adopted to push a movement of a metal wire, and the metal wire is heated to be softened or liquefied at an outlet of the lower end of the casing, and then is immediately in contact with a printed metal. A shell of the miniature furnace 1 can be manufactured from graphite and other high temperature resistant conductive materials in addition to special tungsten alloys.

What are described above are merely some preferred specific embodiments of the present invention, and should not be deemed to define implementation scopes of the present invention, that is, equivalent transformations and modifications made based on the contents of claims and description of the present invention shall all fall within the scope of the present invention.

The invention claimed is:

1. A method for generating droplets for metal three-dimensional printing, the method comprising:
   heating a solid metal raw material to obtain a liquid metal or softened flowable metal;
   forming a metal flow of the liquid metal or softened flowable metal under the effect of an external force;
   accumulating the liquid metal or softened flowable metal on a substrate forming a printed metal to achieve the three-dimensional printing; and
   in a process of accumulating the liquid metal or softened flowable metal, fragmenting the metal flow to form metal droplets;
   wherein
      in the process of accumulating the liquid metal:
         applying a current between the liquid metal and the printed metal,
         heating and gasifying, through only resistance heating, part of a liquid metal flow to cut off the liquid metal flow,
         forming the metal droplets on the printed metal; or
      in the process of accumulating the softened flowable metal:
         applying a current between the softened flowable metal and the printed metal,
         heating and liquifying, through only resistance heating, part of the softened flowable metal to form a liquid metal,
         heating and gasifying part of the liquid metal thus formed by the current to cut off the liquid metal, and forming the metal droplets on the printed metal.

2. The method for generating droplets for metal three-dimensional printing of claim 1, wherein:

when a current is applied between the liquid metal and the printed metal, the current is applied after the liquid metal is in contact with the printed metal;

when a current is applied between the softened flowable metal and the printed metal, the current is applied after the softened flowable metal is in contact with the printed metal.

3. The method for generating droplets for metal three-dimensional printing of claim 1, wherein in the process of accumulating the liquid metal, a current is applied between the liquid metal and a three-dimensional printing support platform or support layer, through only a manner of resistance heating, part of a liquid metal flow is heated and gasified to cut off the liquid metal flow, and the metal droplets are formed on the three-dimensional printing support platform or support layer; or in the process of accumulating the softened flowable metal:

applying a current between the softened flowable metal and a three-dimensional printing support platform or support layer, through only resistance heating, heating and liquifying part of the softened flowable metal to form a liquid metal, further heating and gasifying part of the liquid metal thus formed by the current to cut off the liquid metal, and forming the metal droplets on the three-dimensional printing support platform or support layer;

when the metal component is printed through the three-dimensional printing system, the metal component to be printed is generated in a manner of superposition layer by layer;

the three-dimensional printing support platform is a platform to support the metal component to be printed;

the support layer is a supportive conductive material layer which is in contact with the metal component to be printed.

4. The method for generating droplets for metal three-dimensional printing of claim 1, wherein a heating device heats and melts the solid metal raw material to obtain the liquid metal, or heats the solid metal raw material to form the softened flowable metal, and the liquid metal or softened flowable metal is pushed out of the heating device under a pressure to form the metal flow.

5. The method for generating droplets for metal three-dimensional printing of claim 1, wherein the softened flowable metal does not reach a degree of liquefaction, and is deformable, movable or flowable under an external force.

6. A droplet generating method for metal three-dimensional printing, wherein a heating device is adopted to heat and melt a solid metal raw material to obtain a liquid metal, and the liquid metal forms a metal flow under the effect of an external force; and the three-dimensional printing is achieved by accumulating the liquid metal on a substrate, and in a process of accumulating the liquid metal, the metal flow is fragmentized to form metal droplets, wherein in the process of accumulating the liquid metal, a current is applied between the liquid metal and a printed metal, through only a manner of resistance heating, part of a liquid metal flow is heated and gasified to cut off the liquid metal flow, and the metal droplets are formed on the printed metal.

7. A droplet generating method for metal three-dimensional printing, wherein a heating device is adopted to heat and melt a solid metal raw material to obtain a softened flowable metal, and the softened flowable metal forms a metal flow under the effect of an external force; and the three-dimensional printing is formed by accumulating the softened flowable metal on a substrate, and in a process of accumulating the softened flowable metal, the metal flow is fragmentized to form metal droplets, wherein in the process of accumulating the softened flowable metal, a current is applied between the softened flowable metal and a printed metal, through only a manner of resistance heating, part of the softened flowable metal is heated and liquefied to form a liquid metal, part of the liquid metal thus formed is further heated and gasified by the current to cut off the liquid metal, and the metal droplets are formed on the printed metal.

* * * * *